United States Patent
Shi et al.

(10) Patent No.: US 10,317,623 B2
(45) Date of Patent: Jun. 11, 2019

(54) BACK END OF LINE PROCESS INTEGRATED OPTICAL DEVICE FABRICATION

(71) Applicant: Elenion Technologies, LLC, New York, NY (US)

(72) Inventors: Ruizhi Shi, New York, NY (US); Michael J. Hochberg, New York, NY (US); Ari Jason Novack, New York, NY (US); Thomas Wetteland Baehr-Jones, Arcadia, CA (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/134,086

(22) Filed: Sep. 18, 2018

(65) Prior Publication Data

US 2019/0101697 A1    Apr. 4, 2019

Related U.S. Application Data

(63) Continuation of application No. 15/826,897, filed on Nov. 30, 2017, now Pat. No. 10,101,533, which is a continuation of application No. 14/830,046, filed on Aug. 19, 2015, now Pat. No. 9,851,506, which is a continuation-in-part of application No. 14/798,780, filed on Jul. 14, 2015, now Pat. No. 9,588,298.

(60) Provisional application No. 62/170,772, filed on Jun. 4, 2015.

(51) Int. Cl.
| | | |
|---|---|---|
| *G02B 6/12* | (2006.01) |
| *G02B 6/13* | (2006.01) |
| *G02B 6/134* | (2006.01) |
| *G02B 6/136* | (2006.01) |
| *G02B 6/30* | (2006.01) |
| *G02B 6/132* | (2006.01) |
| *G02B 6/28* | (2006.01) |
| *G02B 6/122* | (2006.01) |

(52) U.S. Cl.
CPC ............ *G02B 6/134* (2013.01); *G02B 6/132* (2013.01); *G02B 6/136* (2013.01); *G02B 6/305* (2013.01); *G02B 6/12002* (2013.01); *G02B 6/1223* (2013.01); *G02B 6/1228* (2013.01); *G02B 6/2821* (2013.01); *G02B 2006/12038* (2013.01)

(58) Field of Classification Search
CPC ........ G02B 6/132; G02B 6/134; G02B 6/136; G02B 6/305; G02B 6/120002; G02B 6/1223; G02B 6/1228; G02B 6/2821
See application file for complete search history.

(56) References Cited

U.S. PATENT DOCUMENTS

| | | | | | |
|---|---|---|---|---|---|
| 5,424,227 | A | * | 6/1995 | Dietrich | ............ H01L 29/66242 257/E21.371 |
| 5,641,992 | A | * | 6/1997 | Lee | .................... H01L 21/28512 257/762 |
| 5,783,483 | A | * | 7/1998 | Gardner | ............ H01L 23/53238 257/E23.162 |
| 6,033,532 | A | * | 3/2000 | Minami | ................. C23C 14/081 204/192.11 |

(Continued)

*Primary Examiner* — Akm E Ullah
(74) *Attorney, Agent, or Firm* — Stratford Managers Corporation

(57) ABSTRACT

An integrated optical device fabricated in the back end of line process located within the vertical span of the metal stack and having one or more advantages over a corresponding integrated optical device fabricated in the silicon on insulator layer.

20 Claims, 5 Drawing Sheets

(56) References Cited

U.S. PATENT DOCUMENTS

| | | | |
|---|---|---|---|
| 2008/0315195 A1* | 12/2008 | Yach | G01R 31/31717 257/48 |
| 2009/0031260 A1* | 1/2009 | Angyal | G06F 17/5068 716/132 |
| 2009/0253253 A1* | 10/2009 | Xiong | H01L 21/31155 438/527 |
| 2013/0207254 A1* | 8/2013 | Ossimitz | G11C 5/06 257/698 |
| 2015/0115389 A1* | 4/2015 | Chuang | H01L 27/14636 257/460 |
| 2015/0194345 A1* | 7/2015 | Chen | H01L 21/76807 257/774 |
| 2016/0035707 A1* | 2/2016 | Hua | H01L 23/4827 257/737 |
| 2017/0185107 A1* | 6/2017 | Kwon | G06F 1/1635 |
| 2017/0358600 A1* | 12/2017 | Becker | H01L 27/0207 |

* cited by examiner

BACK END OF LINE PROCESS INTEGRATED OPTICAL DEVICE FABRICATION

CROSS-REFERENCE TO RELATED APPLICATIONS

This application is a continuation of U.S. patent application Ser. No. 15/826,897, filed Nov. 30, 2017, now allowed, which is a continuation of U.S. patent application Ser. No. 14/830,046, filed Aug. 19, 2015, now U.S. Pat. No. 9,851, 506, which is a continuation-in-part of and claims priority to U.S. patent application Ser. No. 14/798,780, filed Jul. 14, 2015, now U.S. Pat. No. 9,588,298, which claims the benefit of U.S. Provisional Application No. 62/170,772, filed Jun. 4, 2015, each of which is hereby incorporated by reference herein in its entirety.

FIELD OF THE INVENTION

The present disclosure relates to integrated optical devices and their fabrication and particularly to integrated optical devices fabricated using back end of line processes.

BRIEF SUMMARY

According to a first broad aspect disclosed is a method of integrated optical device fabrication including: forming a waveguide portion of an optical device within a vertical span of a metal stack of an integrated semiconductor chip as part of a back end of line fabrication process.

In some embodiments, forming the waveguide portion of the optical device comprises forming the waveguide portion of a material having a first index of refraction greater than a second index of refraction of an oxide material surrounding the waveguide portion. In some embodiments, forming the waveguide portion of the optical device includes doping the oxide material to form a doped waveguide. In some embodiments, doping the oxide material to form the doped waveguide includes doping utilizing at least one of ion implantation and diffusion and wherein the doping utilizes a material comprising at least one of B, F, Al, Ti, As, P, Er, Ni, Si, Cu, Zn, Ge, N, Zr, Nd, and Yb. In some embodiments, forming the waveguide portion of the optical device includes forming an optical waveguide in one of an etch stop layer, a chemical mechanical planarization (CMP) stop layer, and a dielectric material layer used in fabricating the metal stack. In some embodiments, the waveguide portion of the optical device comprises at least one of silicon nitride, poly-silicon, and silicon oxynitride (SiON). In some embodiments, forming the waveguide portion of the optical device includes material deposition within the vertical span of the metal stack. In some embodiments, material deposition includes deposition of at least one of silicon nitride, amorphous silicon, poly-silicon, silicon oxynitride (SiON), silicon-germanium (SiGe), $SiO_2$, silicate glass, and germanium (Ge). In some embodiments, material deposition includes deposition of a silicate glass comprising $SiO_2$, and at least one of $P_2O_5$, $B_2O_3$, F, $Al_2O_3$, $As_2O_3$, $GeO_2$, $N_2$, $TiO_2$, $ZrO_2$, $Nd_2O_3$, $Er_2O_3$, and $Yb_2O_3$. In some embodiments, the waveguide portion of the optical device comprises at least one of silicon nitride, poly-silicon, and silicon oxynitride (SiON), amorphous silicon, silicon-germanium (SiGe), $SiO_2$, silicate glass, and germanium (Ge).

According to a second broad aspect, disclosed is an integrated optical device including at least one waveguide portion fabricated in a back end of line fabrication process formed within a vertical span of a metal stack of an integrated semiconductor chip.

In some embodiments, the at least one waveguide portion comprises a material having a first index of refraction greater than a second index of refraction of an oxide material surrounding the at least one waveguide. In some embodiments, the at least one waveguide portion comprises a doped waveguide comprised of doped oxide material. In some embodiments, the doped waveguide is one of an ion implantation doped waveguide and a diffusion doped waveguide and wherein the doped waveguide is doped with a material comprising at least one of B, F, Al, Ti, As, P, Er, Ni, Si, Cu, Zn, Ge, N, Zr, Nd, and Yb. In some embodiments, the at least one waveguide portion includes a portion of one of an etch stop layer, a chemical mechanical planarization (CMP) stop layer, and a dielectric material layer used in fabricating the metal stack. In some embodiments, the at least one waveguide portion includes at least one of silicon nitride, poly-silicon, and silicon oxynitride. In some embodiments, the at least one waveguide portion includes at least one of deposited silicon nitride, deposited poly-silicon, deposited SiON, deposited SiGe, deposited Ge, deposited $SiO_2$, deposited silicate glass, and deposited amorphous silicon. In some embodiments, the at least one waveguide portion comprises deposited silicate glass comprising $SiO_2$ and at least one of $P_2O_5$, $B_2O_3$, F, $Al_2O_3$, $As_2O_3$, $GeO_2$, $N_2$, $TiO_2$, $ZrO_2$, $Nd_2O_3$, $Er_2O_3$, and $Yb_2O_3$. In some embodiments, the at least one waveguide portion is located vertically between any at least two of etch stop layers, chemical mechanical planarization stop layers, and dielectric layers used for fabricating the metal stack. In some embodiments, the at least one waveguide comprises at least one of silicon nitride, poly-silicon, and silicon oxynitride (SiON), amorphous silicon, silicon-germanium (SiGe), $SiO_2$, silicate glass, and germanium (Ge).

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
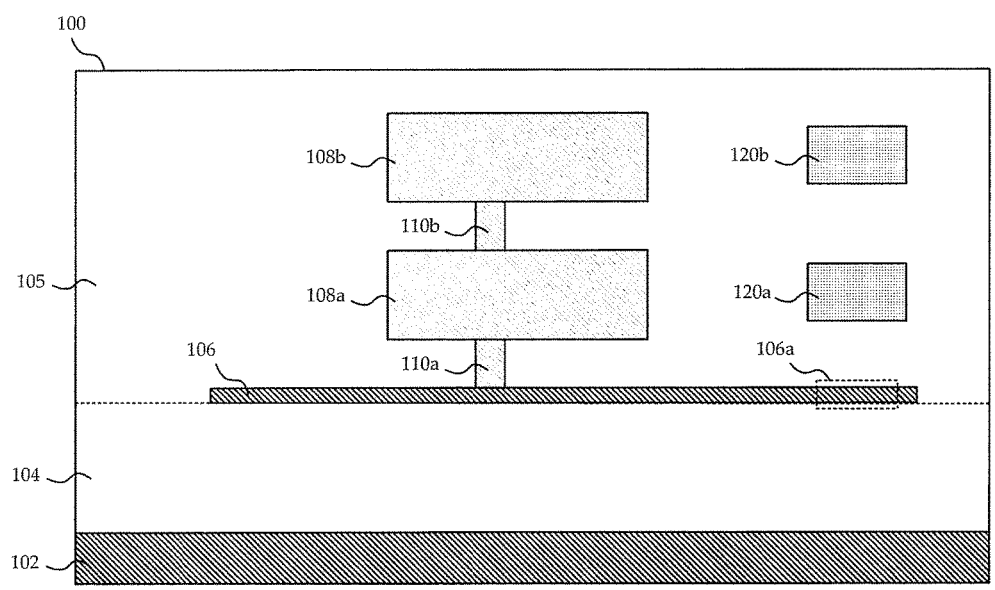
FIG. 1 is an example of doped oxide waveguides fabricated as part of the back end of line fabrication process.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Currently, known integrated silicon photonic devices are typically built on an SOI (silicon on insulator) layer in the front end. This is the same silicon layer in which modulators, detectors, transistors, diodes, and other semiconductor devices are formed, located above the buried oxide (BOX) layer serving as the insulator, and beneath the metal stack. These devices in the front end are formed as part of the front end of line (FEOL) fabrication process which includes fabrication up to but not including process steps utilized to form the metal stack. Other known techniques involve integrated silicon photonic devices and their fabrication in the back end of the traditional electronics wafer. These optical devices, being in the back end, are formed outside and on top of the metal stack in deposited poly silicon, SiN, or other optically suitable material. These devices in the back end are formed as part of a back end deposited silicon fabrication process (BDSP) which occurs after deposition of the final passivation layer.

The back end of line fabrication process (not to be confused with the back end fabrication process), predominantly associated with fabrication of the metal interconnects of the metal stack, includes processing steps after the FEOL up to and including final passivation layer fabrication.

The dominant cost in building products using silicon photonics is the packaging. This is due to a number of factors including the tolerance required for optical connections. Although in principle reducing the complexity and cost of optical packaging can be accomplished by increasing the size of the mode at the interface of the silicon chip, because of the high confinement exhibited by the silicon layer formed in the front end, it is often costly and difficult to build devices in the front end that are capable of matching large optical modes at the interface.

A larger mode would allow larger misalignment tolerance for the same amount of misalignment loss. Silicon photonics being a traditionally a high-confinement platform, absent costly and difficult front end process modification, exhibits misalignment intolerance and a corresponding misalignment loss.

The buried oxide (BOX) layer in standard silicon photonics is about 2 micrometers thick. Due to the resulting proximity of the silicon layer, modes that are larger than 3 micrometers in diameter will have loss due to substrate coupling whether or not misalignment tolerances have been compensated for. Moreover, because the location of the silicon device layer is fixed, it is difficult to align the waveguides in different chips when they have different thicknesses and other geometric differences.

One example of an application encountering one or more the above difficulties is fiber coupling between photonic devices in an SOI layer in the front-end and the larger fiber modes of an optical fiber.

Another problem exhibited by silicon devices formed in the front end is that their optical performance is limited by the coherence length exhibited by their silicon waveguides. Because of the high index contrast between silicon and oxide, the etched sidewall roughness causes unpredictable phase shifts in the optical mode traveling in the waveguides. This unpredictability is difficult to compensate for and limits the performance of some devices. Arrayed waveguide gratings (AWGs) are an example class of optical device whose performance is degraded by this unpredictability.

There are a wide variety of chips that need to be coupled to silicon devices, for example gain chips built in III/V materials, and their modes are of different sizes and shapes. It is difficult to achieve alignment and mode size matching in both x and y required for high efficiency coupling when restricted to a single material such as the silicon of the SOI layer. Integrating optical devices utilizing materials other than silicon during front-end fabrication to achieve desired efficiencies can be difficult and costly.

In the context of the fabrication of optical devices in the back end above the metal stack, because the metal stack is usually more than 2 micrometers thick, it is difficult to couple light through the 2 micrometer gap to the silicon on insulator layer without any intermediate layers in between.

Various techniques have been developed and utilized in an attempt to avoid and/or mitigate one or more of the common problems outlined above.

Silicon nitride has been integrated into the front-end processes to allow fabrication of edgecouplers and arrayed waveguide gratings in the front end. It should be noted, however, that it is still difficult to build edgecouplers for single mode fiber, because the thickness of buried oxide (BOX) layer is usually only 2 micrometers, and the optical mode of the edgecouplers is close enough to the substrate to cause high substrate loss. Deep oxide etching and silicon etching have been utilized to remove substrate loss causing silicon under the edgecoupler, however, they are complicated processes, resulting in devices which are often fragile because of the holes and hollows created inside the chip, and have compatibility issues with further processing. Furthermore, although arrayed waveguide gratings have been fabricated in the front end on silicon and silicon nitride layers, these devices are often large, occupying a substantial footprint on the chip, increasing costs and reducing the scale of integration.

As described hereinbelow, to address one or more of the problems described hereinabove, back end of line processes of fabrication are utilized to fabricate integrated optical devices. Optical devices formed during back end of line fabrication being located within the vertical span of the metal stack, either constructed from the silicon nitride or other compatible material of an etch stop layer or simply formed between such etch stop layers either by doping, deposition, or otherwise avoid substrate loss due to their relative remoteness from the silicon handle, and generally exhibit greater flexibility in fabrication both geometrically and materially than devices fabricated in the front end. During the back end of line processes, in addition to masks for the metal interconnect layers, new masks are used to define the optical devices. This can be done by etching existing backend dielectric materials, or by depositing new materials within the vertical span of the metal stack. Compared to the attempts to achieve the same functionality in the front end, fabricating optical devices as part of the back end of line fabrication process reduces cost and complexity, potentially economizes use of material and process steps, and allows for better alignment, material interfacing, mode matching, avoiding coherence length problems, and for greater flexibility in optical packaging. It also decouples the problem of modulator design from other processes to generate different types of waveguides.

As a result of the above, performance is improved and integration scale is increased, while costs and complexity are controlled when compared to known front end fabrication.

As described hereinbelow, various types of materials and techniques may be utilized to fabricate the optical devices throughout the vertical span of the metal stack including the fabrication of vertical couplers to easily and effectively couple light to/from the silicon on insulator layer in the front end from/to various layers of the back end of line process.

With reference to FIG. 1 an example of using doped oxide waveguides formed in back end of line process to create a large mode for fiber coupling will now be described.

An integrated optical chip 100 includes a silicon substrate or silicon handle 102 on which is formed the buried oxide (BOX) layer 104. As per standard silicon on insulator fabrication processes, a silicon layer 106 is formed on top of the buried oxide layer 104. Much of the silicon layer 106 is utilized for fabrication of semiconductor devices therein, which devices are connected to each other and external contacts with use of a metal stack including metal vias 110a, 110b connecting metal layers 108a, 108b in the stack. Not shown are etch stop layers utilized in the fabrication process. Some portions of the silicon layer 106a are utilized for fabrication of integrated optical devices. Above the silicon layer 106 are various oxide layers 105 which have been deposited during the metal layer fabrication process. Optical waveguides 120a, 120b are formed in the oxide layers 105 within the vertical span of the metal stack through a process of doping the oxide 105 itself. In accordance with the embodiment depicted in FIG. 1, doping can be performed via ion implantation, via diffusion, or any other doping method that achieves doping of existing oxide 105 and can be made compatible with back end of line processes. Reference to "within the vertical span of the metal stack" herein shall be understood to refer to locations vertically at a level at or above the lowest portion of the metal stack and vertically at a level at or below the highest portion of the metal stack and include locations lateral to the metal material of the metal stack.

In the back end of line processes, oxide 105 is deposited and then doped with phosphorous (P). Optical waveguides 120a, 120b could be formed from a thick oxide doped once or from a process of depositing and doping several thin oxide layers. In other embodiments the doping agent includes any of B, F, Al, Ti, As, P, Er, Ni, Si, Cu, Zn, Ge, N, Zr, Nd, and Yb. Doping agents and the doping process are chosen in order to create waveguides 120a, 120b with a higher index of refraction than the surrounding oxide 105. In one embodiment, once a doped optical waveguide 120a has been formed within the oxide 105, the oxide 105 is etched and a metal layer 108a at the same layer as the optical waveguide 120a is deposited. In another embodiment, prior to doping to form the optical waveguide 120a, the oxide 105 at the same layer as the optical waveguide 120a is etched and the metal layer 108a is deposited. In the embodiment illustrated in FIG. 1 the optical waveguides 120a, 120b form an edgecoupler capable of large mode fiber coupling.

A heavy doping of the oxide 105 provides confinement of an optical mode with low loss, a technique that has been used in glass planar lightwave circuit (PLC) technology. Multiple doped waveguides may be used to move the optical mode near to the surface of the chip so that a large mode may be achieved with low substrate loss, an advantage generally obtained by building optical devices within the vertical span of the metal stack. Moreover, depending upon the distance between the optical waveguides 120a, 120b and the silicon layer 106, optical devices can be formed directly under the optical waveguides 120a, 120b without the risk of unwanted coupling or loss to the silicon layer. The optical waveguides 120a, 120b, are not subject to the high confinement limitations applicable to optical devices fabricated from the silicon layer 106.

Figure 2:
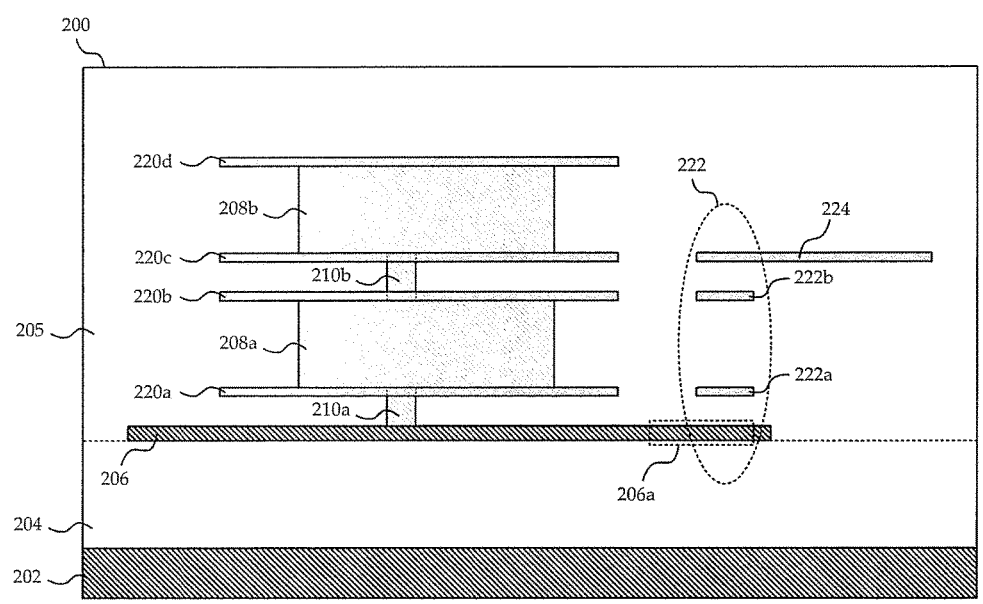
FIG. 2 is an example of using the silicon nitride (SiN) etch stop layers in standard CMOS back end of line fabrication process to create integrated optical devices.

With reference to FIG. 2, an example of using the silicon nitride (SiN) etch stop layers in standard CMOS back end of line fabrication process to create integrated optical devices will now be described.

An integrated optical chip 200 includes a silicon substrate or silicon handle 202 on which is formed the buried oxide (BOX) layer 204. A silicon layer 206 is formed on top of the buried oxide layer 204, much of the silicon layer 206 of which is utilized for fabrication of semiconductor devices therein, which devices are connected to each other and external contacts with use of a metal stack including metal vias 210a, 210b connecting metal layers 208a, 208b in the stack. Above the silicon layer 206 are various oxide layers 205 which have been deposited during the metal layer fabrication process. Etch stop layers 220a, 220b, 220c, 220d utilized in the fabrication process to form the metal stack are typically made of silicon nitride (SiN) or other suitable etch stop material. In the embodiment shown in FIG. 2, the material is compatible with optical device fabrication, such as SiN or poly-silicon. A portion of a first etch stop layer 222a as well as a portion of the second etch stop layer 222b are utilized to form an optical device, namely, a vertical coupler 222 to optically couple light between a portion of the silicon layer 206a in which an optical device has been formed with an arrayed waveguide grating (AWG) 224 formed from an etch stop layer 220c, 224 above the vertical coupler 222.

Although the AWG 224 of the embodiment of FIG. 2 is in the third SiN layer from the silicon on insulator layer 206, in other embodiments the AWG is formed in any other etch stop layer used to fabricate the metal stack. In the CMOS back end of line process, thin SiN layers are deposited before etching oxide for metal. In the embodiment illustrated in FIG. 2, additional masks are used to etch the SiN layer to define the waveguides of the AWG 224, and the vertical coupler 222a, 222b, and thereafter oxide is deposited on top of the SiN layers. Using masks which define the corresponding metal layer interconnects of the metal stack, the oxide is etched followed by metal deposition.

Forming an AWG 224 in silicon nitride of an etch layer in the back end of line process has an advantage over fabricating it in the silicon on insulator layer. Silicon nitride has a lower index of refraction compared to silicon, so the coherence length in a waveguide in SiN is longer than that in a similarly sized and shaped waveguide in silicon. The performance of an AWG 224 formed in silicon nitride will be increased due to improved predictability of phase shifts in the optical mode traveling in the waveguides. As with the embodiment described in association with FIG. 1, the device is in a layer that was deposited in the back end of line fabrication process and the distance between the AWG 224 and the silicon handle 202 is large enough to prevent substrate loss. Moreover, because the distance between the AWG 224 and the devices on the silicon on insulator layer 206 can be more than 4 micrometers, the light in the AWG 224 will not couple to the silicon layer 206. This allows fabrication of optical circuits directly beneath the AWG 224, reducing the space and cost on the chip.

Although the embodiment depicted in FIG. 2 utilize portions of etch stop layers for optical device fabrication within the vertical span of the metal stack, chemical mechanical planarization (CMP) stop layers made for example of SiN, and/or other dielectric material layers used in fabricating the metal stack, such as various layers of SiON, are contemplated for optical device fabrication.

Figure 3:
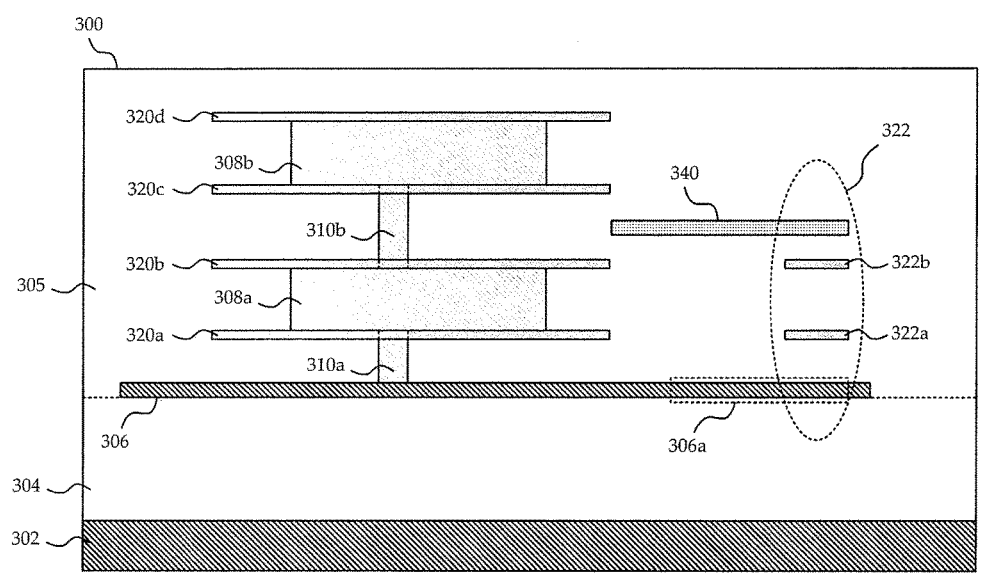
FIG. 3 is an example of deposited SiN, poly-Si or a-Si (amorphous silicon) optical devices fabricated between two metal layers during back end of line fabrication processes.

With reference to FIG. 3 an example of deposited SiN (or amorphous silicon) optical devices fabricated between two metal layers during back end of line fabrication processes will now be described.

An integrated optical chip 300 includes a silicon substrate or silicon handle 302 on which is formed the buried oxide (BOX) layer 304. A silicon layer 306 is formed on top of the buried oxide layer 304, much of the silicon layer 306 of which is utilized for fabrication of semiconductor devices therein, which devices are connected to each other and external contacts with use of a metal stack including metal vias 310a, 310b connecting metal layers 308a, 308b in the stack. Above the silicon layer 306 are various oxide layers 305 which have been deposited during the metal layer fabrication process. Etch stop layers 320a, 320b, 320c, 320d utilized in the fabrication process to form the metal stack are typically made of silicon nitride (SiN) or other suitable etch stop material. In the embodiment shown in FIG. 3, the material is compatible with optical device fabrication, such as SiN. A portion of a first etch stop layer 322a as well as a portion of the second etch stop layer 322b are utilized to form an optical device, namely, a vertical coupler 322 to optically couple light between a portion of the silicon layer 306a in which an optical device is formed with a multimode interference coupler (MMI) 340 or other optical device formed in a SiN or a-Si layer deposited vertically between two metal layers 308a, 308b and between etch stop layer 320c above the vertical coupler 322 and the upper etch stop layer 322b of the vertical coupler 322.

Although the MMI 340 of the embodiment of FIG. 3 is between the third and fourth etch stop layers 320b, 320c, in other embodiments the MMI is formed between any other two consecutive etch stop layers used to fabricate the metal stack. In the embodiment illustrated in FIG. 3, after the first metal layer 308a has been completed, and before oxide etching for making metal vias 310b, SiN or a-Si is deposited on top of a layer of the oxide 305 and etched to leave a desired structure and thereby form optical circuits such as MMI 340. Oxide cladding is deposited on top of the SiN or a-Si layer, and thereafter vias 310b are fabricated, followed by fabrication of the rest of the metal stack above it.

Forming an MMI 340 by deposition during the back end of line process has an advantage over fabricating it in the silicon on insulator layer. Back end of line process fabrication is more flexible in terms of which materials can be deposited thereby allowing to better materials matching between different chips. As with the other embodiments described in association with FIG. 1 and FIG. 2, the device is in a layer that was deposited in the back end of line fabrication process and the distance between the MMI 340 and the silicon handle 302 is large enough to prevent substrate loss. Moreover, because the distance between the MMI 340 and the devices on the silicon on insulator layer 306 can be more than 4 micrometers (given an appropriate choice of metal layers for deposition therebetween), the light in the MMI 340 will not couple to the silicon layer 306. This allows fabrication of optical circuits directly beneath the MMI 340, reducing the space and cost on the chip.

Although the embodiment depicted in FIG. 3 illustrates deposition of an optical device between etch stop layers within the vertical span of the metal stack, fabrication of optical devices between any one or more of etch stop layers, chemical mechanical planarization (CMP) stop layers and other dielectric material layers used in fabricating the metal stack are contemplated.

In other embodiments, silicon oxynitride (SiON), polysilicon, silicon-germanium (SiGe), or germanium (Ge) are deposited on top of the oxide 305 and etched to form the optical device 340.

In specific variations of the embodiment depicted in FIG. 3, the optical device 340 is formed of the same material as the surrounding oxide 305, however with use of a deposition process utilizing alternate deposition conditions, such as a lower deposition rate, than that used to deposit the surrounding oxide 305, in order to create a denser material having a higher refractive index than the oxide 305 surrounding the optical device 340. In one such variant of the embodiment of FIG. 3, the oxide 305 and the optical device 340 both comprise $SiO_2$.

Higher indices can also be achieved through other known techniques such as processes including chemical vapor deposition (CVD) or flame hydrolysis deposition to form, for example, a silicate glass (comprising $SiO_2$ and any of $P_2O_5$, $B_2O_3$, F, $Al_2O_3$, $As_2O_3$, $GeO_2$, $N_2$, $TiO_2$, $ZrO_2$, $Nd_2O_3$, $Er_2O_3$, and $Yb_2O_3$) which has a higher index of refraction than the surrounding $SiO_2$.

Deposition methods in accordance with the embodiment depicted in FIG. 3 include generally methods of deposition such as CVD, plasma-enhanced chemical vapor deposition (PECVD), low pressure chemical vapor deposition (LP-CVD), and Flame Hydrolysis deposition or any other method of deposition which is compatible with back end of line fabrication processes.

Deposition materials in accordance with the embodiment depicted in FIG. 3 include generally any materials compatible with any methods of deposition on top of an oxide 305 compatible with back end of line fabrication processes, which are also suitable for optical device fabrication, including any of SiN, a-Si, SiON, poly-silicon, SiGe, Ge, $SiO_2$, $P_2O_5$, $B_2O_3$, F, $Al_2O_3$, $As_2O_3$, $GeO_2$, $N_2$, $TiO_2$, $ZrO_2$, $Nd_2O_3$, $Er_2O_3$, and $Yb_2O_3$.

As described hereinabove fabrication of integrated optical devices in both the silicon layer of the front end and integrated optical devices formed in the backend of line fabrication process preferably involve some form of integrated on chip optical coupling between them.

Figure 4A:
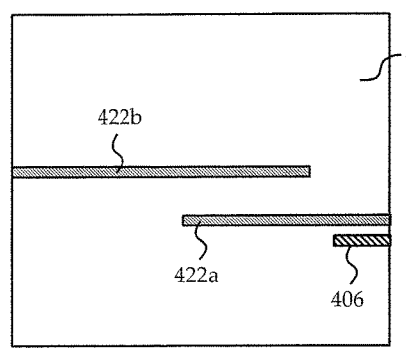
FIG. 4A is a vertical cross section of an example coupling between optical devices formed in the standard silicon front end and optical devices fabricated as part of the back end of line fabrication process.
Figure 4B:
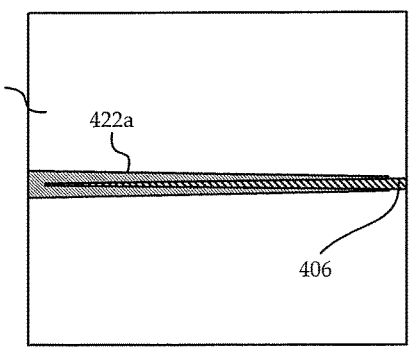
FIG. 4B is a top plan view of the coupling of FIG. 4A.
Figure 4C:
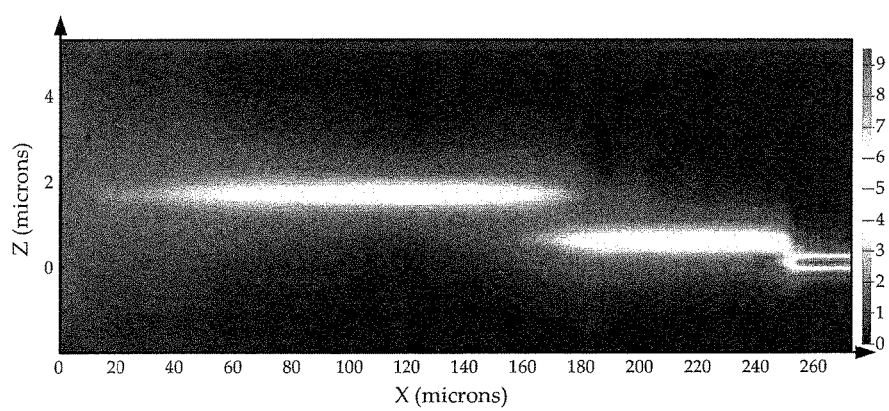
FIG. 4C is a simulated electric field of an optical signal propagating through the coupling of FIGS. 4A and 4B.

With reference to FIG. 4A, FIG. 4B, and FIG. 4C an example coupling between optical devices formed in the standard silicon front end and optical devices fabricated as part of the back end of line fabrication process will now be described.

FIG. 4A is a vertical cross-section of the simulation region depicted in FIG. 4C, which consists of one silicon front-end layer 406 and two back-end of line process layers 422a, 422b. Between them is deposited oxide 405. FIG. 4B is the top view of the vertical coupler that consists of two inverse tapers 422a 406. FIG. 4C depicts the simulated electrical field of an optical signal propagating through the waveguides 422a, 422b, 406 depicted in FIG. 4A and FIG. 4B. As can be seen clearly in FIG. 4C, the light is coupled from one layer to another through the vertical coupler.

Although the particular example embodiment depicted in FIG. 4A, FIG. 4B, and FIG. 4C possesses a vertical coupler utilizing two tapers, other kinds of vertical coupling, including those utilizing grating couplers or rings, for example, are also contemplated.

Figure 5:
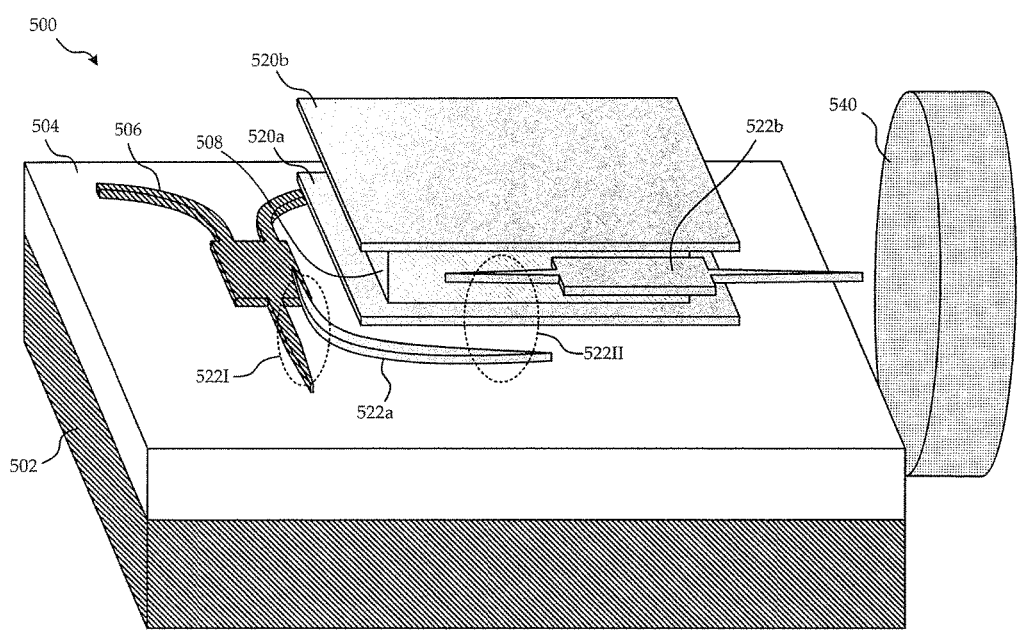
FIG. 5 is a perspective view of an example vertical coupler coupling an optical device built in the front end with an optical device formed in the back end of line fabrication process.

With reference to FIG. 5 an example vertical coupler coupling an optical device built in the front end with an optical device formed in the back end of line fabrication process will now be described.

An integrated optical chip indicated by numeral 500 includes a silicon substrate or silicon handle 502 on which is formed the buried oxide (BOX) layer 504. A silicon layer 506 is formed on top of the buried oxide layer 504, much of the silicon layer 506 of which (not shown) is utilized for fabrication of semiconductor devices therein, which devices are connected to each other and external contacts with use of a metal stack including metal layer 508. Above the silicon layer 506 are various oxide layers (not shown) which have been deposited during the metal layer fabrication process. Etch stop layers 520a, 520b utilized in the fabrication process to form the metal stack are typically made of silicon nitride (SiN) or other suitable etch stop material. In the embodiment shown in FIG. 5, the etch stop material is compatible with optical device fabrication, such as SiN. A tapered portion of the silicon layer 506 and a portion of a first etch stop layer 522a form a first vertical coupler 522I while a different portion of the first etch stop layer 522a as well as a tapered portion of the second etch stop layer 522b are utilized to form a second vertical coupler 522II. These vertical couplers 522I, 522II serve to optically couple light between the silicon layer 506 utilized for optical devices with the etch stop layer 522b used to form an optical device 522b which happens to be an edge coupler for coupling light with an optical fiber 540.

Although the embodiments above have provided specific examples of integrated optical devices formed during back end of line processes, formed of specific materials at specific locations it should be understood that in accordance with what is disclosed herein, all optical devices compatible with back end of line process fabrication are contemplated. As such, in addition to the edge couplers, AWG, MMI, and vertical couplers, grating couplers, splitters, directional couplers, polarization splitters, polarizers, echelle gratings, thermal phase shifters, and other various optical devices are contemplated.

Although the embodiments above have made specific reference to particular materials utilized in the etch stop, CMP stop and other layers and for fabrication of optical devices through deposition or doping materials, all materials compatible with back end of line process fabrication suitable for optical devices are contemplated.

Although the embodiments above have provided specific examples of particular fabrication processes, layers, and techniques, all processes compatible and possible for inclusion in back end of line processes generally during fabrication of the metal stack, are contemplated. For example, the materials can be placed in the backend using a number of different processes rather than just a single process. The fabrication process can utilize a different numbers of masks, more process steps, and/or improved process control, as necessary.

Although the embodiments above have been described with reference to existing backend layers, additional layers can be added during back end of line processing.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of integrated optical device fabrication forming an optical device within a vertical span of a metal stack of an integrated semiconductor chip as part of a back end of line fabrication process, comprising:
   providing a substrate;
   providing a device layer including at least one optical device on the substrate;
   depositing a first oxide layer over the semiconductor devices;
   forming a first metal via through the first oxide layer into contact with the device layer;
   depositing a second oxide layer comprising an oxide material over the first oxide layer;
   etching a first portion of the second oxide layer;
   depositing metal in the first portion of the second oxide layer for connection with the first metal via and external contacts;
   forming a second portion of the second oxide layer into a first waveguide for coupling light to or from the at least one optical device.

2. The method according to claim 1, further comprising:
   depositing a third oxide layer over the second oxide layer;
   forming a second metal via through the third oxide layer into contact with the device layer;
   depositing a fourth oxide layer of the third oxide layer;
   etching a first portion of the fourth oxide layer;
   depositing metal in the first portion of the fourth oxide layer for connection with the second metal via and external contacts; and
   forming a second portion of the fourth oxide layer into a second waveguide for coupling light to or from the at least one optical device via the first waveguide.

3. The method according to claim 1, wherein forming a second portion of the second oxide layer comprises doping the oxide material to form a doped first waveguide.

4. The method according to claim 3, wherein doping the oxide material comprises doping utilizing at least one of ion implantation and diffusion.

5. The method according to claim 4, wherein the doping utilizes a material comprising at least one of B, F, Al, Ti, As, P, Er, Ni, Si, Cu, Zn, Ge, N, Zr, Nd, and Yb.

6. The method according to claim 4, wherein the doping utilizes a material comprising phosphorous.

7. The method according to claim 1, further comprising forming a first etch stop layer between the first and second oxide layers; wherein etching a first portion of the second oxide layer comprises etching down to the first etch stop layer.

8. A method of integrated optical device fabrication forming an optical device within a vertical span of a metal stack of an integrated semiconductor chip as part of a back end of line fabrication process, comprising:
   providing a substrate;
   providing a device layer including at least one integrated optical device on the substrate;
   depositing a first oxide layer over the semiconductor devices;
   forming a first metal via through the first oxide layer into contact with the device layer;
   depositing a first stop layer over the first oxide layer;
   depositing a second oxide layer comprising an oxide material over the first stop layer;
   etching a first portion of the second oxide layer down to the first stop layer;

depositing metal in the first portion of the second oxide layer for connection with the first metal via and external contacts;

forming a portion of the first stop layer into a first waveguide for coupling light to or from the at least one integrated optical device.

9. The method according to claim 8, further comprising:
depositing a second stop layer over the second oxide layer;

depositing a third oxide layer over the second stop layer;

forming a first portion of the second stop layer into a second waveguide forming a vertical coupler with the first waveguide for coupling light to or from the at least one integrated optical device.

10. The method according to claim 9, further comprising forming an edge coupler in another portion of the second stop layer for coupling light from an external waveguide to the at least one integrated optical device via the vertical coupler.

11. The method according to claim 9, wherein the first and second waveguides comprises inverse tapered waveguides.

12. The method according to claim 9, further comprising:
forming a portion of the third oxide layer into an optical device optically coupled to the vertical coupler.

13. The method according to claim 12, wherein the optical device comprises a multimode interference coupler.

14. The method according to claim 12, wherein forming the second portion of the second oxide layer comprises depositing the second portion at a lower deposition rate than surrounding oxide providing denser material with a higher refractive index.

15. The method according to claim 12, wherein forming the second portion of the second oxide layer comprises chemical vapor deposition of a compatible material into the second portion.

16. The method according to claim 9, further comprising:
depositing a third stop layer over the third oxide layer; and
forming a portion of the third stop layer into an optical device optically coupled to the vertical coupler.

17. The method according to claim 16, further comprising:
forming a second metal via through the third oxide layer down to the device layer;
depositing a fourth oxide layer over the third stop layer;
etching a first portion of the third oxide layer down to the third stop layer; and
depositing metal in the first portion of the third oxide layer for connection with the second metal via and external contacts.

18. The method according to claim 16, wherein the optical device comprises an arrayed waveguide grating (AWG) for coupling light to or from an external waveguide to the at least one integrated optical device in the device layer.

19. The method according to claim 17, wherein the AWG is more than 4 micrometers from the at least one integrated optical device.

20. An integrated semiconductor device, comprising:
a substrate;
a device layer on the substrate;
a first oxide layer over the device layer;
a second oxide layer over the first oxide layer;
a third oxide layer over the second oxide layer;
a fourth oxide layer over the third oxide layer;
a fifth oxide layer over the fourth oxide layer
a metal stack for connection with external contacts, including a first metal portion in a first portion of the second oxide layer extending between the first and third oxide layers, and a first metal via extending between the first metal portion and the device layer, and a second metal portion in a first portion of the fourth oxide layer extending between the third and fifth oxide layers, and a second metal via extending between the second metal portion and the device layer;
an optical coupler including a first waveguide in a second portion of the third oxide layer, and a second waveguide in a second portion of the fifth oxide layer for coupling light to or from the at least one device layer.

* * * * *